United States Patent [19]
Saito et al.

[11] 4,051,489
[45] Sept. 27, 1977

[54] EXPOSURE TIME CONTROL DEVICE FOR ELECTRIC CAMERA SHUTTER

[75] Inventors: Takeo Saito, Yotsukaido; Youichi Seki, Chiba, both of Japan

[73] Assignee: Seiko Koki Kabushiki Kaisha, Japan

[21] Appl. No.: 577,768

[22] Filed: May 15, 1975

[30] Foreign Application Priority Data

May 16, 1974    Japan .................... 49-54909

[51] Int. Cl.² .............................................. G03B 7/08
[52] U.S. Cl. ........................... 354/23 D; 354/50; 354/60 R; 354/60 A; 354/289
[58] Field of Search .............. 354/23 D, 50, 51, 60 R, 354/60 A, 289

[56] References Cited

U.S. PATENT DOCUMENTS

| | | | |
|---|---|---|---|
| 3,638,544 | 2/1972 | Kitai | 354/51 |
| 3,651,744 | 3/1972 | Okada | 354/51 |
| 3,748,979 | 7/1973 | Wada | 354/23 D |
| 3,824,608 | 7/1974 | Toyoda | 354/23 D |

OTHER PUBLICATIONS

TTL Cookbook by Don Lancaster, H. W. Sams & Co., 1974, p. 208.

Designing With TTL Integrated Circuits, Texas Instruments Electronics Series, 1971, p. 256.

Primary Examiner—Russell E. Adams
Attorney, Agent, or Firm—Robert E. Burns; Emmanuel J. Lobato; Bruce L. Adams

[57] ABSTRACT

An exposure time control device of an electric camera shutter includes a brightness time conversion circuit for developing a single pulse having a width representative of the brightness of a subject to be photographed and a reference pulse generating circuit for generating reference pulses at a standard rate. A reversible counter counts the reference pulses for a period of time equal to the duration of the single pulse. Upon termination of the single pulse, a reversible counter control circuit applies control signals to the reversible counter to read-out the count stored therein for controlling the shutter exposure time. A selector switch selects the input position of the reference pulses to the reversible counter in dependence upon exposure time factors other than brightness of the subject thereby enabling the selection of the exposure time in accordance with the subject brightness as well as other factors, such as film sensitivity and diaphragm setting.

3 Claims, 6 Drawing Figures

EXPOSURE TIME CONTROL DEVICE FOR ELECTRIC CAMERA SHUTTER

BACKGROUND OF THE INVENTION

This invention relates to an exposure time control device for use in an electric camera shutter. The device is of digital memory reproduction type, wherein the pulses developed from a pulse generating circuit are counted in a counter circuit which counts a number of pulses corresponding to the brightness of the subject to be photographed for thereby controlling the exposure time.

One technique for introducing exposure determining factors other than the brightness of the subject (for example, film sensitivity and diaphragm value) into an exposure time control device of aforementioned type has been proposed already in the U.S. Pat. No. 3,876,876 filed by the applicants of the present invention. According to the already proposed technique, in order to introduce exposure time determining factors other than the brightness of the subject to be photographed, the input position of reference pulses into a counter circuit is selected by a selector switch thereby permitting the introduction of factors such as film sensitivities and diaphragm values which are included in multiple series, but such a technique is disadvantageous in that it does not permit the introduction of film sensitivities outside of the multiple series such as ASA 125, ASA 160, ASA 250, ASA 320, etc.

It is therefore an object of this invention to eliminate the aforementioned disadvantage and to provide an improved exposure time control device for use in an electric camera shutter.

BRIEF SUMMARY OF THE INVENTION

According to this invention, the aforementioned object is achieved by an exposure time control device of digital memory reproduction type provided with a brightness/time conversion circuit adapted to generate a single pulse which has a pulse width corresponding to the brightness of the subject to be photographed and a reference pulse generating circuit adapted to generate reference pulses having a predetermined constant frequency. During the period of said single pulse the reference pulses developed from said reference pulse generating circuit are memorized in a counter circuit and, in response to the shutter starting, the exposure time is controlled depending on the value memorized in said counter circuit, or switch controls the selection of the input position of said reference pulses into said counter circuit, thereby introducing exposure time determining factors other than the brightness of the subject to selectively vary the pulse width of the single pulse developed from said brightness/time conversion circuit.

DETAILED DESCRIPTION OF PREFERRED EMBODIMENT

Figure 1:
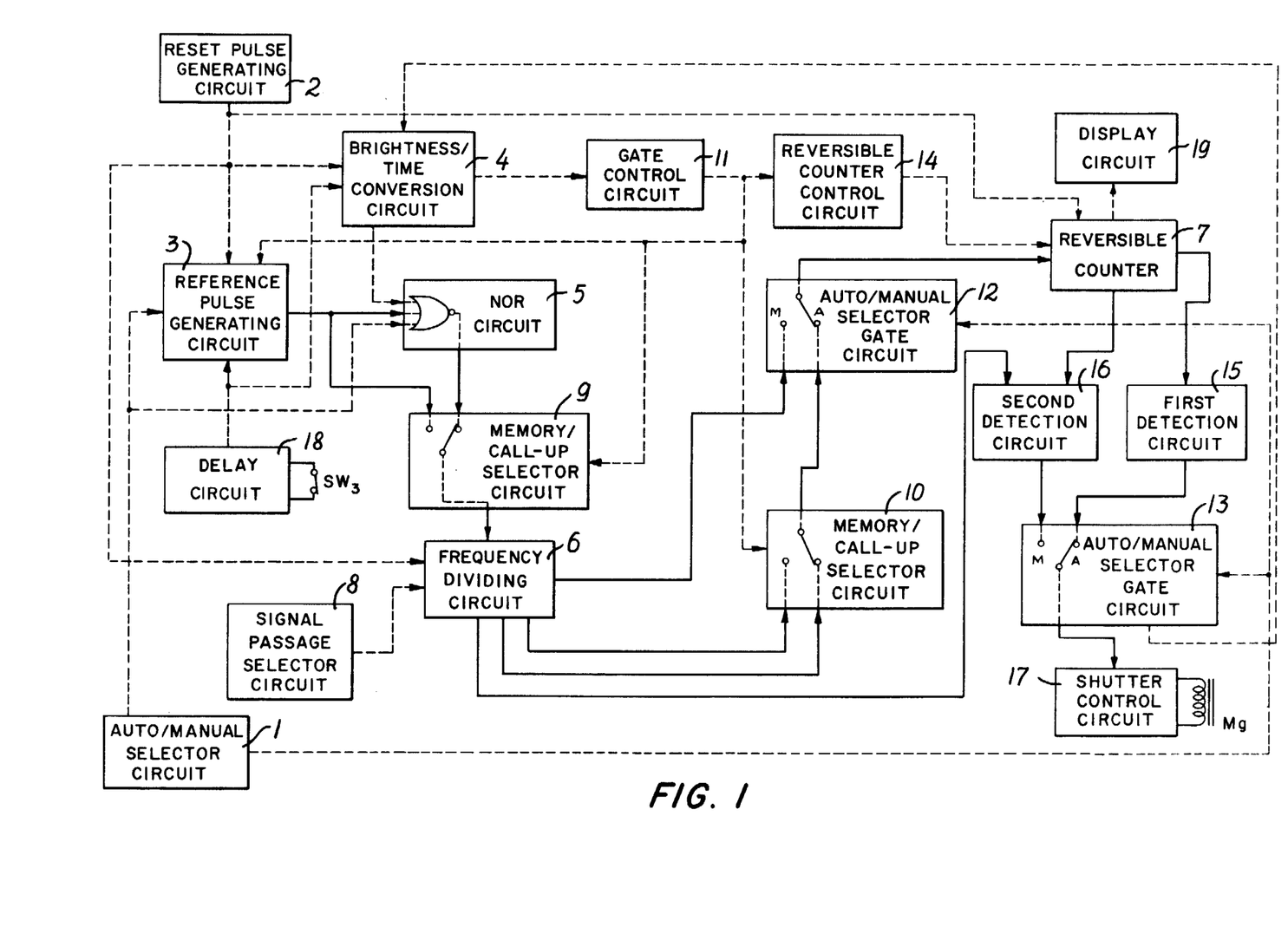
FIG. 1 is a block diagram of one embodiment of a device according to this invention.

Now the embodiment of this invention will be described with reference to the accompanying drawings. Illustrated in FIG. 1 is a block diagram representing the composition of the exposure time control device according to one embodiment of this invention and to simplify an understanding of the circuitry operation, the labeled blocks are interconnected by solid lines which represent signal paths for signals which determine the duration of the exposure time and by dashed lines which represent signal paths for control signals which control the operation of the circuit. Stated otherwise, the solid lines denote signal paths or courses along which pass the standard pulses generated by the standard pulse generator circuit and the dashed lines denote signal paths or courses along which pass the various control signals. In this block diagram, an auto/manual selector circuit includes a selector switch which is switchable from automatic to manual exposure time adjustment, and vice versa (the automatic and manual exposure time adjustments will be referred to hereinafter as auto mode and manual mode, respectively), 2 is a circuit which generates reset pulses and is connected to a power supply (not shown), 3 is a circuit which generates reference pulses having a preselected constant frequency, 4 is a brightness/time conversion circuit which, when the exposure time control device is set in the automatic exposure time adjusting mode, measures the light that has passed through the photographing lens by means of a photoconductive element, such as CdS, and generates a single pulse having a pulse width corresponding to the brightness of the subject to be photographed, and 5 is a NOR circuit which, when the exposure time control device is set to auto, allows the reference pulses coming from said reference pulse generating circuit 3 to pass through it during the single pulse period determined by the output from the brightness/time conversion circuit 4.

A frequency dividing circuit 6 is operable, when the device is set to auto mode and functions during a memory cycle introduce exposure time determining factors other than the brightness of subject to be photographed and functions during a call-up cycle permit the reference pulses to pass through a preset number of stages for thereby effecting a frequency division 6 is operable when the device is set to manual mode and permits the references pulses to pass through all the stages for frequency division and then applies the frequency- divided reference pulses to a reversible counter 7. Under conditions where an addition control signal is applied from a reversible counter control circuit 14, the reversible counter 7 adds and memorizes the input pulse number; whereas under conditions where a subtraction control signal is applicated, it subtracts the input pulse number from the previously memorized pulse number.

Indicated at 8 is a signal passage selector circuit provided with a plurality of control terminals. In the auto mode, said signal passage selector circuit 8 serves to introduce the exposure time determining factors other than the brightness of the subject to be photographed and, when an appropriate control terminal is selected depending on such exposure determining factors, applies reference pulses to a corresponding counter stage of the reversible counter 7 either directly or through the frequency dividing circuit 6; whereas in the manual mode, when a control terminal is selected depending on the manually adjusted exposure value, said signal passage selector circuit 8 transfers the reference pulses, which have been frequency-divided through the frequency dividing circuit 6 or reversible counter 7, from either said frequency dividing circuit 6 or reversible counter 7 to a second detection circuit 16.

Indicated at 9 and 10 are memory/call-up selector gate circuits which, under control of a gate control circuit 11, switch over the pulse passages between the memory and call-up cycles. In the manual mode where no memory operation is involved, a pulse passage for the call-up cycle is selected. The gate control circuit 11 develops a signal for controlling said memory/call-up selector gate circuits which, under control of the auto/manual selector circuit 1, switch over the pulse passage between the auto and manual adjustments. A reversible counter control circuit 14 applies an addition or subtraction control signal to the reversible counter 7 under control of the signal from the gate control circuit 11. In the auto mode, a first detection circuit 15 detects the time when the value memorized in the reversible counter 7 becomes zero and develops a shutter closing signal; whereas in the manual mode, the second detection circuit 16 develops a shutter closing signal when a pulse number corresponding to the manually adjusted exposure value is reached. Indicated at 17 is a shutter control circuit; 18 is a delay circuit which develops a trigger pulse in response to the operation of a timing switch SW3; and 19 is a display circuit which in the auto mode displays a shutter speed corresponding to the value memorized in the reversible counter 7.

Now the operation of the exposure time control device having a construction as described hereinabove will be described briefly. When the device is set in the auto mode by the auto-manual selector circuit 1, the auto/manual selector gate circuits 12 and 13 select the pulse passage which is adapted for the auto cycle. Under these conditions, when the power switch is turned on by depression of the shutter release button (not shown), an addition control signal is applied to the reversible counter 7 from the reversible counter control circuit 14 and at the same time the reversible counter 7 and frequency dividing circuit 6 are reset upon receiving a reset pulse developed from the reset pulse generating circuit 2. Within the duration of the pulse width of the single pulse developed from the brightness/time conversion circuit 4, the reference pulses which are developed from the reference pulse generating circuit 3 at the time when the rear edge of the reset pulse is reached through the NOR circuit 5 and memory/call-up selector gate circuit 9 and then, by the signal passage selector circuit 8 which is selected depending on the exposure time determining factors other than the brightness of the subject such as film sensitivity and diaphragm value, are directed to the frequency dividing circuit 6 so as to be suitably frequency-divided therein. The frequency-divided reference pulses are then added and memorized in the reversible counter 7 after having passed through the memory/call-up selector gate circuit 10 and auto/manual selector gate circuit 12, or otherwise they are directly added and memorized in the reversible counter 7 by the operation of the signal passage selector circuit 8. The memorized value controls the display circuit 19 for thereby displaying the optimum shutter speed.

At the termination of the single pulse which comes from the brightness/time conversion circuit 4, the rear edge of the single pulse controls the gate control circuit 11 to develop to memory/call-up selector signal, which in turn effects a switching-over between the memory/call-up selector gate circuits 9 and 10. The rear edge of said single pulse also controls the reversible counter control circuit 14 to apply a subtraction control signal to the reversible counter 7 for thereby turning it to the subtraction control state and at the same time stops the reference pulse generating circuit 3.

In a single lens reflex camera, which will be used hereinafter for purpose of describing the invention, all of the foregoing operations complete before the incident light onto the photoconductive element has been shut off by the swing-up movement of the finder mirror which occurs upon depression of the shutter release button. With a further depression of the shutter release button, the shutter starts opening and a timing switch SW3 is turned off by a shutter blade opening member (not shown). After the lapse of a preselected period of time, a delay circuit 8 develops a trigger pulse for making the reference pulse generating circuit 3 again generate reference pulses and for resetting the shutter speed indicated by the display circuit 19. The reference pulses pass through the memory/call-up selector gate circuit 9 into the frequency dividing circuit 6 where they are frequency divided. After that, the reference pulses pass through the memory/call-up selector gate circuit 10 and auto/manual selector gate circuit 12 and are applied to the reversible counter 7 so that a value corresponding to the applied reference pulses is sequentially subtracted from the value previously memorized in the reversible counter 7. When the value being memorized becomes zero, the first detection circuit 15 detects it and develops a shutter closing signal, which in turn controls the shutter control circuit 17 to deenergize an electromagnet Mg for thereby releasing the shutter blade closing member (not shown).

In the manual mode when an exposure value is manually adjusted, the auto/manual selector gate circuits 12 and 13 are switched over to the pulse passage adapted for the manual mode operation and the reversible counter 7 is kept connected to the frequency dividing circuit 6. The reference pulse developed from the reference pulse generating circuit 3 is applied to the reversible counter 7 after having passed through all the stages of the frequency dividing circuit 6. As is described hereinafter, the display circuit 19 is so arranged that in the manual mode it makes no display action. Upon depression of the shutter release button when the power switch is being turned on, just like in the auto mode operation, an addition control signal is applied from reversible counter control circuit 14 to reversible counter 7 and, at the same time, the reversible counter 7 and frequency dividing circuit 6 are reset by pulse developed from the reset pulse generating circuit 2. Simultaneously with the power supply, the output from the brightness/time conversion circuit 4 reaches the signal level which appears in the auto mode operation at the termination of the single pulse. Under control of such output signal, the gate control circuit 11 develops a memory/call-up selector signal to select either the memory/call-up selector gate circuit 9 or 10. Said signal also controls the reversible counter control circuit 14 to hold it in the addition control state.

When the shutter release button is further depressed, this permits the finder mirror to swing up and the shutter starts opening. In association with the shutter opening operation and when the timing switch SW3 opens, a trigger pulse is developed with a constant time lag predetermined by the delay circuit 18. Upon receiving this trigger pulse, the reference pulse generating circuit 3 develops reference pulses, which are applied to the frequency dividing circuit 6 by way of the memory/call-up selector gate circuit 9. After having passed through all the stages of the frequency dividing circuit 6, said reference pulses pass through the auto/manual selector gate circuit 12 into the reversible counter 7 and are frequency-divided therein. The frequency-divided reference pulses are then transferred to the second detection circuit 16 through the particular control terminal which is selected depending on the manually adjusted exposure value. As a result, a shutter closing signal is applied to the shutter control circuit 17 to thereby close the shutter by deenergizing the electromagnet Mg.

Now the invention will be described in more detail with reference to FIG. 2 which comprises a circuit diagram corresponding to the block diagram of FIG. 1. In the following description "1" and "0" mean a higher and lower signal level, respectively.

In an early stage of the shutter release operation when the power switch SW1 is closed to supply the power, in the auto mode a "0" signal is applied onto a control line 1—1 by the auto/manual selector circuit 1 as will be further described later. At this moment the output point G of the delay circuit 18, the output point C of the brightness/time conversion circuit 4, the output point D of the gate control circuit 11 and the output point E of the reversible counter control circuit 14 are all turned to "0". Likewise, the input point H of the shutter control circuit 17 turns to "0" to energize the electromagnet Mg adapted for the shutter control circuit 17. On the other hand, the "0" signal present at the output point E of the reversible counter control circuit 14 is passed through a NAND circuit 14—6, of which one input terminal is connected to the control line 1—1 by way of an inverter 14—5, and reaches an addition control line 7-15 to turn the addition control signal T to "1" so that the reversible counter 7 is set to the addition control state.

The reset pulse generating circuit 2 is a monostable multivibrator composed of a NOR circuit 2-1 and inverter 2-2 and in synchronism with the power supply develops a positive reset pulse at the output point B of the inverter 2-2. During the period when the output point B of the inverter 2-2 has a "1" signal level, the inverter 23 has an output of "0" which is transferred onto a reset line 7-11 of the reversible counter 7 to reset the same. Furthermore, the output from the inverter 23 passes through a NAND circuit 24 and is turned to "1" signal, which is then transferred onto a reset line 6-21 of the frequency dividing circuit 6 to reset the same. (The reversible counter 7 is reset at "0;" whereas the frequency dividing circuit 6 is reset at "1.") Since the output point B is at the level of "1," a transistor 4-1 of the brightness/time conversion circuit 4 becomes conducting so that the capacitor 4-3 is not charged. The "1" signal present at the output point B is applied to a NOR circuit 3-7 by way of an AND circuit 3-1, OR circuit 3-5, AND circuit 3-5 and OR circuit 3-6 of the reference pulse generating circuit 3.

The pulse generating section of the reference pulse generating circuit 3 is of known type consisting of a NOR circuit 3-7, inverter 3-8, resistor 3-9 and capacitor 3-10. Under the foregoing conditions, a "1" signal is being applied to the NOR circuit 3-7 and hence no pulse is developed from the pulse developing section. At the termination of the reset pulse, the output point B turns to "0," the transistor 4-1 of the brightness/time conversion circuit 4 becomes non-conducting and the capacitor 4-3 starts being charged by way of a photoconductor element 4-2. At the same time, the "0" signal at the output point B is applied through the AND circuit 3-1, OR circuit 3-3, AND circuit 3-5 and OR circuit 3-6 of the reference pulse generating circuit 3 into the NOR circuit 3-7 of the pulse generating section so that reference pulses start being developed.

The generated reference pulses then pass through an AND circuit 9-1 and OR circuit 9-3 of the memory/call-up selector gate circuit 9 by way of the inverter 11 and NOR circuit 5. The signal passage selector circuit 8 is provided with a plurality of control terminals (8-1, 8-2, . . . , 8-9) connected to the contacts of the selector switch SW2 as illustrated in FIG. 3. As will be described hereinlater, when a contact of the selector switch SW2 is selected depending on the film sensitivity and diaphragm value, the control terminal connected to the contact turns to "0." Consequently, the switching elements (8-15, 8-16, . . . , 8-19, 16-1, 16-2, . . . , 16-9) and the NOR circuits (8-11, 8-12, . . . , 8-14) begin conducting under control of said control terminal and permit the signal to pass through them. For example, when the terminal 8-5 is selected and turns to "0," then the switching elements 8-15 and 16-5 become conducting. The reference pulses having passed through the OR circuit 9-3 of the memory/call-up selector circuit 9 further pass through the AND circuit 10-1 and OR circuit 10-3 of the memory/call-up selector circuit 10 by way of the switching element 8-15. Thereafter, the reference pulses pass through the AND circuit 12-1 and OR circuit 12-3 of the auto/manual selector gate circuit 12 into the reversible counter 7. (The pulse passing through the switching element 16-5 will be described later.)

The reversible counter 7 is composed of a plurality of cascade-connected flip-flop counter stages 7-1, 7-2, . . . , 7-n which are connected at their terminals $\overline{Q1}, \overline{Q2}$. . . , $\overline{Qn}$ to the gate terminals of the switching elements 15-1, 15-2, . . . , 15-n of the first detection circuit 15, respectively. Conventional gate circuits 7-1' . . . 7-4' are respectively interposed between the first five counter stages 7-1 . . . 7-5 and are gated on in dependence upon signals from respective NOR circuits 8-11 . . . 8-14 as explained hereinafter during discussion of the overall mode of operation. When the pulse number applied to the reversible counter 7 is memorized, at least one of the terminals $\overline{Q1}, \overline{Q2}, \ldots, \overline{Qn}$ turns to "0" and hence the gate terminal of the corresponding switching element of the first detection circuit 15 turns to "0." Thus, the switching element becomes conducting and an auto detection line 15-21 turns to "0." Thereafter, when the capacitor 4-3 of the brightness/time convertion circuit 4 reaches a predetermined voltage level, the output from the switching circuit 4-4 is inverted from "0" to "1." The duration from the transistor 4-1 turning off until the output from the switching circuit 4-4 is inverted from "0" to "1" varies depending on the switching level of the switching circuit 4-4 which is determined by the capacitance and resistance of the capacitor 4-3 and the resistance of the photoconductive element 4-2 which varies depending on the brightness of the subject to be photographed. The duration therefore becomes longer when the brightness of the subject is low and becomes shorter when the brightness of the subject is high. The inversion of the output from the switching circuit 4-4 turns the signal level at the output point C to "1" by means of the AND circuit 4-6 and OR circuit 4-8, so that the NOR circuit 5 turns off and the reference pulses developed from the reference pulse generating circuit 3 are not transferred to the reversible counter 7 any more.

Under these conditions, the "0" signal on the control line 1-1 is being applied to the other input terminal of the AND circuit 4-6 by way of the inverter 4-9. Because the signal level at the output point C of the brightness/time conversion circuit 4 having been inverted to "1," the monostable multivibrator consisted of the NOR circuit 26 and inverter 27 is triggered to develop a single pulse, which is transferred onto the reset line 6-21 by way of the NAND circuits 28 and 24 to reset the frequency dividing circuit 6 for the second time.

At this moment, the diode 11-1 of the gate control circuit 11 is turned off and the capacitor 11-3 starts being charged. When the capacitor 11-3 has been charged to a predetermined level, the signal level at the output point D of the switching circuit 11-4 is inverted from "0" to "1." The thusly obtained "1" signal is transferred to the memory/call-up selector gate circuits 9 and 10 by way of the inverter 11-5 and applies a "0" signal to the AND circuits 9-1 and 10-1 and also to the AND circuit 3-1 of the reference pulse generating circuit 3. In this event, however, since the input signal into the AND circuit 3-2 turns to "1" simultaneously, a "1" signal is applied to the NOR circuit 3-7 by way of the OR circuit 3-3, AND circuit 3-5 and OR circuit 3-6 to terminate the oscillation. The inversion at the output point D of the switching circuit 11-4 triggers the monostable multivibrator composed of the NOR circuit 14-8 and inverter 14-9 for thereby generating a single pulse. The thusly generated positive single pulse is then transferred onto the selection control lines 7-12 and 7-13 of the reversible counter 7 by way of the inverter 14-10 and NOR circuit 14-11, thereby turning the selection control signal $t$ to "1" and $\bar{t}$ to "0" for a short period of time. In addition, simultaneously with this single pulse development, the diode 14-1 is turned off by the inversion at the output point D of the switching circuit 11-4, whereby the capacitor 14-3 starts being charged. When the capacitor 14-3 has been charged to a predetermined level, the signal level at the output point E of the switching circuit 14-4 is inverted from "0" to "1." The resulting "1" signal is then transferred onto the subtraction control line 7-14 by way of the NAND circuit 14-6 to thereby turn the subtraction control signal $\bar{T}$ to "1" and hence to set the reversible counter 7 to the subtraction control state. When the reversible counter 7 has been shifted from addition control state to subtraction control state by the inversion at the output point E of the switching circuit 14-4, the single pulse developed from the monostable multivibrator consisting of the NOR circuit 14-8 and inverter 14-9 terminates and the selection control signals $t$ and $\bar{t}$ turn to "0" and "1," respectively. Herein, the selection control signals $t$ and $\bar{t}$ are used to prevent the value memorized in the reversible counter 7 from being varied during switching over between the addition control signal T and subtraction control signal $\bar{T}$.

In the last stage of the shutter releasing operation, the shutter starts opening and simultaneously the timing switch SW3 is forced to open by means of the shutter blade opening member, so that the delay circuit 18 starts operating to invert the signal level at the output point G from "0" to "1" with a predetermined time lag. By way of the inverter 18-4, the "0" signal passes through the AND circuit 3-2 and OR circuit 3-3 of the reference pulse generating circuit 3 and then passes through the AND circuit 3-5 and OR circuit 3-6 into the NOR circuit 3-7 to resume the reference pulse generation. The generated reference pulses are then applied to the frequency dividing circuit 6 over the inverter 3-11 and the AND circuit 9-2 and OR circuit 9-3 of the memory/call-up selector gate circuit 9. In the frequency dividing circuit, the reference pulses are sequencially frequency-divided through the frequency dividing stages 6-1, 6-2, ..., 6-($m$ − 3) an taken out of the output terminal of the frequency dividing stage 6-($m$ − 3). Thereafter, the frequency-divided reference pulses are applied to the reversible counter 7 by way of the AND circuit 10-2 and OR circuit 10-3 of the memory/call-up selector gate circuit 10 and the auto/manual selector gate circuit 12. The pulse number memorized in the reversible counter 7 is reduced sequentially by subtracting the input pulses which have been frequency-divided in the frequency dividing circuit 6 from said previously memorized pulse number. When the value being memorized becomes zero, all the counter stages of the reversible counter 7 turn to "1" at their output terminals $\bar{Q}1, \bar{Q}2, \ldots, \bar{Q}n$ and accordingly the gate terminals of all the switching elements 15-1, 15-2, ..., 15-$n$ of the first detection circuit 15 turn to "1," making these switching elements non-conducting. As a result, the input into the AND circuit 15-22 of the first detection circuit 15 turns to "1" and hence the output from said AND circuit 15-22 turns to "1," which is then applied to a transistor 17-1 of the shutter control circuit 17 by way of the AND circuit 13-1 and OR circuit 13-3. Thus, the electromagnet Mg which when energized keeps hold of the shutter blade closing member is deenergized, so that the shutter blade closing member is released to thereby close the shutter. The inversion from "0" to "1" at the output point H of the OR circuit 13-3 is applied to the NOR circuit 3-7 of the reference pulse generating circuit 3 to stop the reference pulse generation again.

Now the manual mode operation will be described. After an exposure value has been adjusted manually, and during an early stage of the camera release operation, the power switch SW1 is closed. As soon as the power is supplied, the "1" signal is applied to the associating circuits via the control line 1-1 as described previously so that the exposure time control device is entirely set in the manual operation mode and, just like in the auto operation mode, the signal level at the output point G of the delay circuit 18 becomes "0." Since the "1" signal on the control line 1-1 is applied to the OR circuit 4-8 by way of the AND circuit 4-7, the signal level at the output point C of the brightness/time conversion circuit 4 turns to "1." Furthermore, since the "1" signal is applied to the NOR circuit 5, this circuit is turned off. On the other hand, the signal level at input terminal H of the shutter control circuit 17 turns to "0" to thereby energize the electromagnet Mg by way of the transistor 17-1.

1-1 is being applied to one input terminal of the NAND circuit 14-6 of the reversible counter control circuit 14, the control signal from the reversible counter 7 is maintained at "1" irrespective of the output signal from the switching circuit 14-4 which is being applied to the other input terminal of said NAND circuit 14-6. Accordingly, the reversible counter 7 is maintained in the addition control state. Just like in the auto mode operation, the reset pulse developed from the reset pulse generating circuit 2, after resetting the reversible counter 7 and frequency dividing circuit 6, makes the transistor 4-1 of the brightness/time conversion circuit 4 non-conducting by the rear edge thereof and starts charging the capacitor 4-3. However, since a "0" signal is being applied to one input terminal of the AND circuit 4-6, there presents a "1" signal at the output point C of the OR circuit 4-8 irrespective of the output signal from the switching circuit 4-4. The signal at the output point B which has turned to "0" at the termination of the reset pulse is applied to the OR circuit 3-6 by way of the AND circuit 3-1, OR circuit 3-3 and AND circuit 3-5 of the reference pulse generating circuit 3. However, since the signal level at the output terminal of the AND circuit 3-4 is "1," the OR circuit 3-6 has a signal level of "1" at the output terminal thereof and generates no reference signal. The "1" signal at the output terminal C of the brightness/time conversion circuit 4 makes the diode 11-1 of the gate control circuit 11 non-conducting. Accordingly, when the output level from the switching circuit 11-4 is inverted from "0" to "1," just like in the auto mode operation the selection control signals t and $\bar{t}$ are also inverted and, after the lapse of a predetermined period of time, again inverted. During these operations, the output level from the switching circuit of the reversible counter control circuit 14 is inverted. Nevertheless, as is mentioned hereinabove the addition control signal T of the reversible counter 7 is inverted by the NAND circuit 14-6 but maintains the reversible counter 7 in the addition control state.

Just like in the auto mode operation, after the shutter starts operating when the timing switch SW3 opens and the signal level at the output point G of the delay circuit 18 is inverted from "0" to "1," this "1" signal is turned to "0" by the inverter 18-4 and applied to the AND circuit 3-4 of the reference pulse generating circuit 3 and also applied to the NOR circuit 3-7 by way of the OR circuit 3-6 to initiate the reference pulse generation. The thusly generated reference pulses are then applied to the frequency dividing circuit 6 by way of the AND circuit 9-2 and OR circuit 9-3 of the memory/call-up selector gate circuit 9. The pulses which have been frequency-divided during passing through all the frequency dividing stages are then applied to the reversible counter 7 by way of the AND circuit 12-2 and OR circuit 12-3 of the auto/manual selector gate circuit 12 and again frequency-divided. Under these conditions, all the passages included in the signal passage selector circuit 8 through which the pulses pass during the auto mode operation are shut off by the NAND circuit 8-20 and AND circuit 10-1 which are under control of the gate control circuit 11, and also depending on the manually adjusted exposure value one of the control terminals (8-1, 8-2, . . . , 8-9) of the signal passage selector circuit 8 is selected. If the terminal 8-5 is selected for instance, then the switching elements 8-15 and 16-5 will be conducted but the pulses passing through the switching element 8-15 will be shut off by the AND circuit 10-1 of the memory/call-up selector gate circuit 10 as described hereinbefore.

On the other hand, the pulses which have passed through the OR circuit 9-3 of the memory/call-up selector gate circuit 9 and sequentially frequency-divided by the frequency-dividing stages 6-1, 6-2, . . . , 6-m of the frequency-dividing circuit 6 are applied to the counter stage 7-1 of the reversible counter 7 for a further frequency division. Thereafter, when the signal level at the output point Q4 of the counter stage 7-4 becomes "1," this "1" signal is transferred onto a manual detection line 16-21 through the switching element 16-5. Then the signal is applied to the AND circuit 13-2 of the auto/manual selector gate circuit 13 to invert the signal level at the output point H of the OR circuit 13-3 from "0" to "1" and also apply a "1" signal to the transistor 17-1 of the shutter control circuit 17 so that the electromagnet Mg is deenergized to close the shutter. Furthermore, since the "1" signal is applied to the NOR circuit 3-7 of the reference pulse generating circuit 3 due to the inversion from "0" to "1" of the signal level at the output point H, the development of the reference pulses ceases.

FIGS. 3A and 3B are fragmented views of selector switches SW2 for selecting the control terminals 8-1, 8-2 . . . , 8-9 of the signal passage selector circuit 8. Of these switches, the selector switch SW2-A of FIG. 3A is adapted to introduce the exposure determining factors other than the brightness of the subject during the auto mode operation; whereas the selector switch SW2-M of FIG. 3B is adapted to determine the exposure time during the manual mode operation. Now these selector switches will be described with reference also to FIG. 2.

Figure 2A:
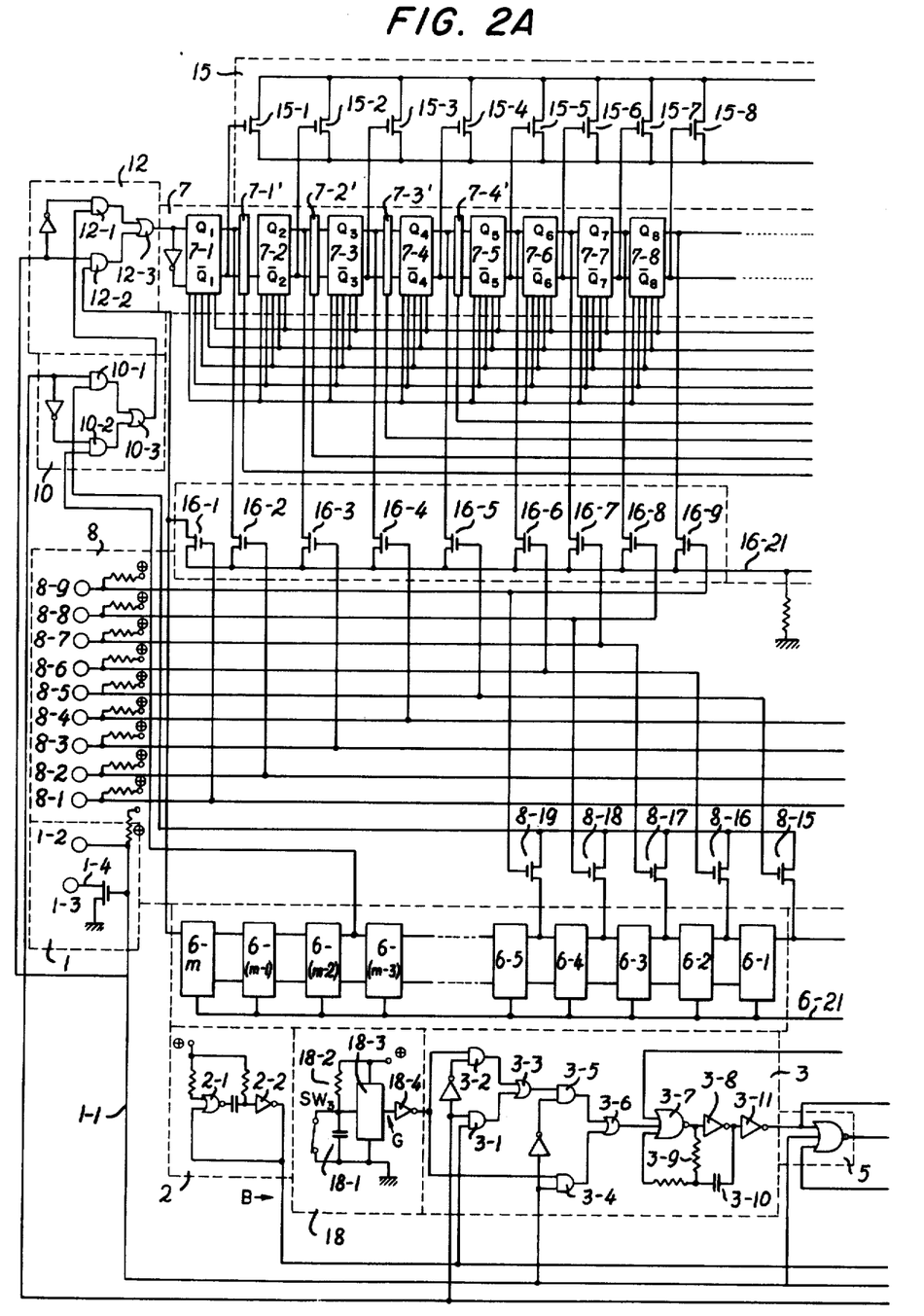
FIG. 2A and 2B comprise a circuit diagram showing the circuitry of the block diagram of FIG. 1.
Figure 2B:
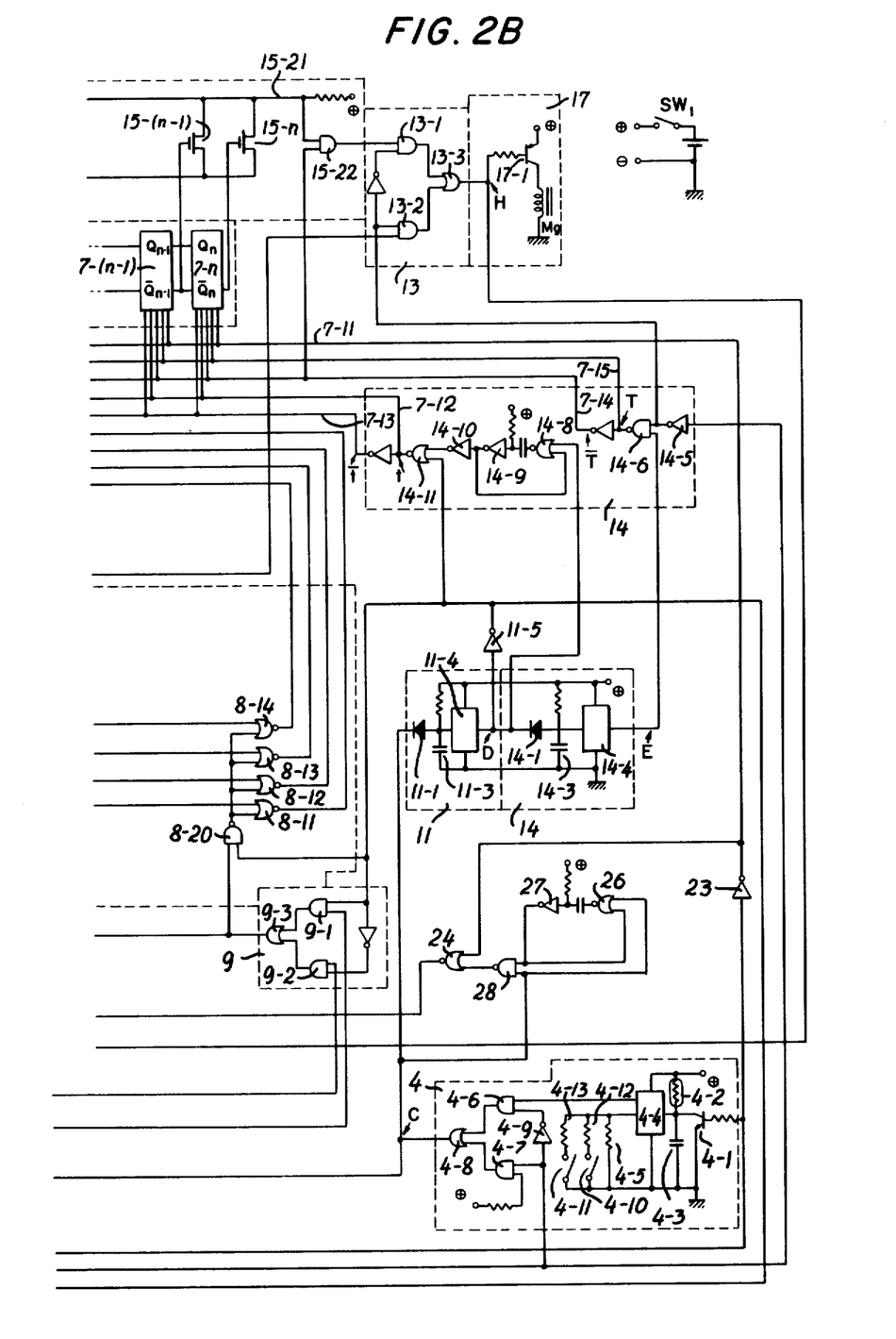
Figures 3A, 3B, 4:
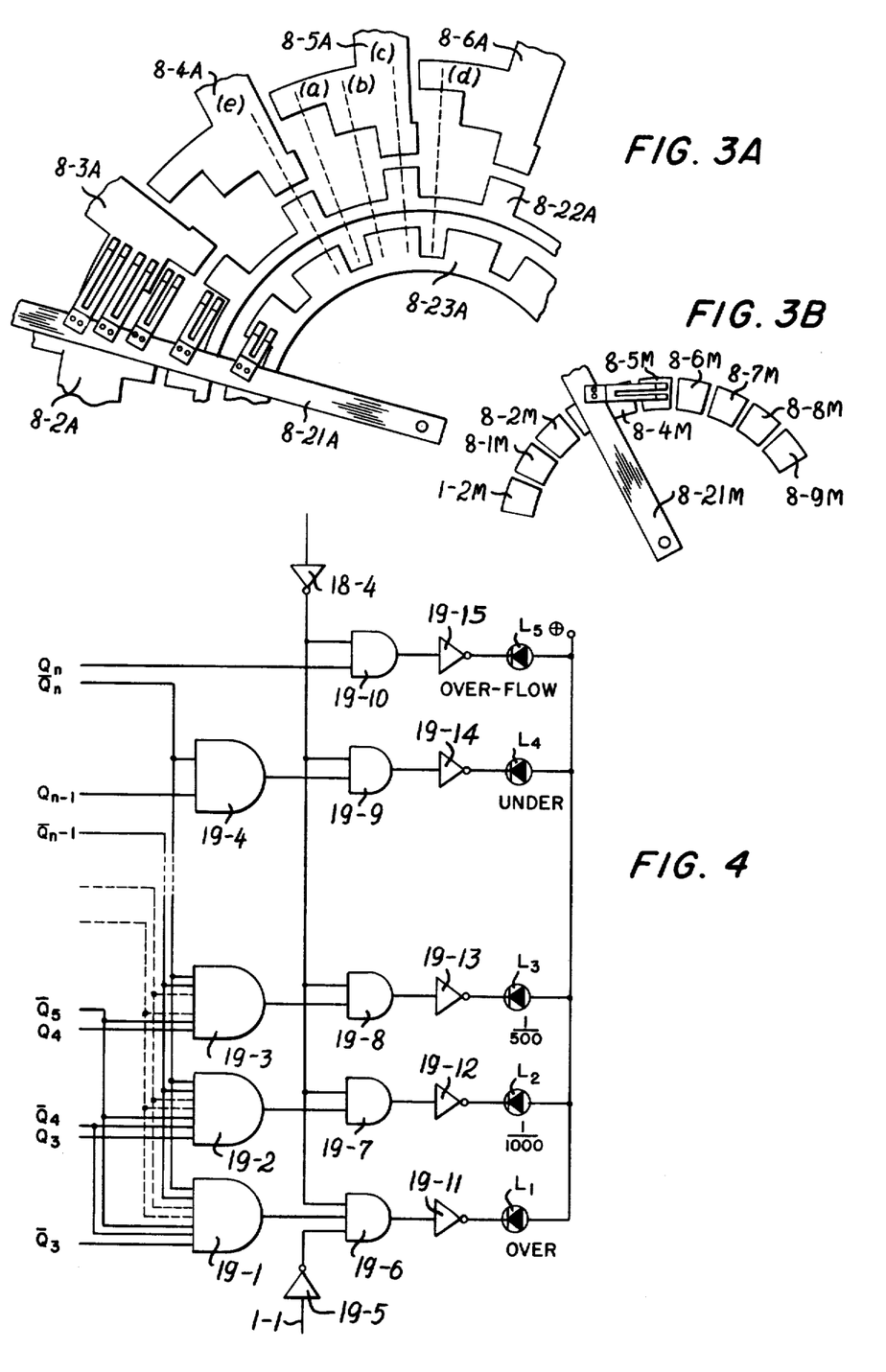
FIGS. 3A and 3B are fragmented views of the selector switches incorporated in the circuit of FIG. 2.
FIG. 4 is a circuit diagram of the display circuit incorporated in the circuit of FIG. 2.

The selector switch SW2-A is composed of a plurality of contacts 8-1A, 8-2A, . . . , 8-9A, 8-22A, 8-23A and a movable contact segment 8-21A connected to a P-channel FET 1-4 as shown in FIG. 2. The movable contact segment 8-21A is actuated by a connecting member (not shown) connected to both the diaphragm ring (not shown) and film sensitivity setting ring (not shown) mounted on the camera. The movable contact segment 8-21A is also connected to the drain terminal 1-3 of the FET 1-4. The contacts 8-1A, 8-2A, . . . , 8-9A are connected to the control terminals 8-1, 8-2, . . . , 8-9 of the signal passage selector circuit 8 and the contacts 8-22A and 8-23A are connected to the terminals 4-10, 4-11 of the resistors 4-12, 4-13 which are adapted to vary the switching level of the switching circuit 4-4 included in the brightness/time conversion circuit 4. On the other hand, the selector switch SW2-M is composed of a grounded movable contact segment 8-21M and contacts 8-1M, 8-2M, . . . , 8-9M and 1-2M. The corresponding contacts of said two selector switches and a control terminal of the signal passage selector circuit 8 are connected together (8-1A, 8-1M, 8-1; 8-2A, 8-2M, 8-2; . . . ; 8-9A, 8-9M, 8-9) and the contact 1-2M is also connected to the control terminal 1-2. As shown in FIG. 3A, the movable contact segment 8-21A of the selector switch SW2-A is formed in such a manner that it has three different contact states for each of the contacts 8-1A, 8-2A, . . . , 8-9A. For example, when the movable contact segment 8-21A is in the position shown by the dotted line (a), it is in contact only with the contact point 8-5A; in the position shown by the dotted line (b), it is in contact with both the contacts 8-5A and 8-23A; in the position shown by the dotted line (c), it is in contact with the contacts 8-5A, 8-23A and 8-22A. The similar relation is true for all the other contacts 8-1A, 8-2A, . . . , 8-9A.

The switching circuit 4-4 of the brightness/time conversion circuit 4 is so arranged as to vary the switching level by means of resistors 4-5, 4-12 and 4-13. When the resistor 4-5 is grounded at its one end and the other resistors 4-12 and 4-13 are opened at their one end, the switching level is determined by the resistor 4-5. Supposing that the pulse width obtained at this time by the brightness/time conversion circuit 4 is 2, the resistance value of the resistor 4-12 is set so that the pulse width of 2 $\frac{1}{2}$ is obtained for the same subject when the terminal 4-10 is grounded and the resistors 4-5 and 4-12 are grounded parallel to each other. The resistance value of the resistor 4-13 is set so that the pulse width of 2 ⅓ is obtained for the same subject when, in addition to the terminal 4-10, the terminal 4-11 is also grounded and all the resistors 4-5, 4-12 and 4-13 are grounded in parallel to each other. In this way, depending on whether the resistors 4-12 and 4-13 are grounded or not, the pulse width obtained by the brightness/time conversion circuit 4 can be selected in three steps. This means that under constant exposure conditions, such as brightness of the subject, the pulse number applied to the reversible counter 7 can be selected in three different steps: 2, 2 ⅓, 2 ⅔.

Now the automatic and manual exposure time adjusting operations will be described in greater detail. In the auto mode operation, the movable contact segment 8-21 is shifted to the contact 1-2M by the auto/manual selector ring. As a result, the signal level at the control terminal 1-2 and hence on the control line 1-1 turns to "0" to make the FET 1-4 conduct and set the movable contact segment 8-21A of the selector switch SW2-A to "0." Consequently, the contact which is in contact with the movable contact segment 8-21A becomes "0." Under these conditions, the control line is 1-1 and accordingly for effecting an auto mode operation, the exposure time determining factors other than the brightness of the subject such as the film sensitivity and diaphragm value can be introduced by sliding the movable contact segment 8-21A to a suitable position. Supposing that the position, where the movable contact segment 8-21A is in the position shown by the dotted line (a) of FIG. 3A and in contact with the contact 8-5A, corresponds to ASA 100, F5.6 and that the number of pulses passing through the NOR circuit 5 and the conducting switching circuit 8-15 during the pulse width obtained in the brightness/time conversion circuit 4 is 32, then 32 pulses will be applied to the reversible counter 7 and the signal level at the output Q6 of the counter stage 7-6 will be inverted from "0" to "1". Under conditions of ASA 125, F5.6, the movable contact segment 8-21A will contact with the contact 8-5A at the position shown by the dotted line (b) of FIG. 3A. Since the pulse width obtained in the brightness/time conversion circuit 4 becomes 2 ⅔, the number of pulses x1 passing through the NOR circuit 5 will be determined by the following proportional expression:

$$2 : 2 \tfrac{2}{3} = 32 : x1$$

Thus, $x1 = 8 \times 2 \tfrac{2}{3} \approx 25$. Under conditions of ASA 160, F5.6, the movable contact segment 8-21A is in the position shown by the dotted line (c) and the pulse width obtained in the brightness/time conversion circuit 4 becomes 2 ⅓. Thus, the number of pulses x2 passing through the NOR circuit 5 will be determined by the following proportional relation:

$$2 : 2 \tfrac{1}{3} = 32 : x2$$

Therefore, $x2 = 8 \times 2 \tfrac{1}{3} \approx 20$.

Under conditions of ASA 200, F5.6, the movable contact segment 8-21A is in the position of (d). In this position the contact 8-6A alone becomes "0" and the switching element 8-16 becomes conducting. Accordingly, the reference pulses developed in the reference pulse generating circuit 3 pass through the NOR circuit 5 and, after having been frequency-divided by one stage included in the frequency dividing circuit 6, are applied to the reversible counter 7 by way of the switching element, so that for the same or equal brightness of the subject, 32 pulses pass through the NOR circuit 5. The 32 pulses are then frequency-divided by one step into 16 pulses, which are applied to the reversible counter 7.

Under conditions of ASA 80, F5.6, the movable contact segment 8-21A is in the position shown by the dotted line (e). In this position, the contacts 8-4A, 8-22A and 8-23A become "0" and, for equal brightness of the subject, 20 pulses pass through the NOR circuit 5. These pulses are then applied to the gate 7-1' arranged between the counter stages 7-1 and 7-2 of the reversible counter 7 by way of the NOR circuit 8-14 which is made by the control terminal to permit the passing of pulses, so that the outputs Q4 and Q6 from the counter stages 7-4 and 7-6 are inverted to "1." This is practically equivalent to 40 pulses being applied to the reversible counter 7.

As is described hereinabove, the input position of the reference pulses into the reversible counter 7 and the switching level of the switching circuit 4-4 of the brightness/time conversion circuit 4 are suitably selected to memorize the pulse number in the reversible counter 7, and the number of pulses having a constant frequency is subtracted from the thusly memorized value. In this way, supposing that the exposure time obtained when the movable contact segment 8-21A contacts with a corresponding contact at a position shown by the dotted line (a) is 2, then for the same brightness of subject the exposure times obtained when shifting the movable contact segment 8-21A to the positions shown by dotted lines (e), (a), (b), (c) and (d) will be 2 4/3, 2 ⅓, 2 ⅔, 2 ⅓, 2⁰, respectively. This means that even film sensitivities which are not included in the multiple series can be introduced.

In the auto mode operation, when the movable contact segment 8-21M of the switch SW2-M is switched over from terminal 1-2 to the other, then the signal level on the control line 1-1 will be turned to "1" and the FET will become non-conducting to set the corresponding circuits in the manual mode and turn the movable contact segment 8-21A to "1." Supposing now that the terminal 8-2M of the selector switch SW2-M is turned to "0" by the movable contact segment 8-21M, then as is described hereinbefore the reference pulses developed from the reference pulse generating circuit 3 will be frequency-divided sequentially by the frequency-dividing stages 6-1, 6-2, . . . , 6-m of the frequency dividing circuit 6 and applied to the couter stage 7-1 of the reversible counter 7 to invert the counter stage 7-1. The frequency-divided reference pulses are then transferred onto the manual detection line 16-21 by way of the switching element 16-2 to thereby control the exposure time.

FIG. 4 illustrates the shutter speed display circuit 19 according to one embodiment of this invention, which will be described also with reference to FIG. 2. The input terminals of the AND circuits 19-1, 19-2, 19-3 and 19-4 are connected to the terminals Q3, $\overline{Q3}$, Q4, $\overline{Q4}$, $\overline{Q5}$, . . . , Q$n$−1 and $\overline{Qn}$ of the counter stages included in the reversible counter 7; the outputs from the AND circuits 19-1, 19-2, 19-3 and 19-4 are applied to the AND circuits 19-6, 19-7, 19-8 and 19-9; and the terminal Q$n$ of the last stage of the reversible counter 7 is connected to the input terminal of the AND circuit 19-10. The output from the AND circuits 19-6, 19-7, 19-8, 19-9 and 19-10 are connected to the inverters 19-11, 19-12, 19-13, 19-14 and 19-15, respectively. To the output terminals of these inverters are connected display elements L1, L2, L3, L4 and L5 consisting of luminescent diodes as shown in the drawing. To the AND circuit 19-6 is also connected the control line 1-1 by way of the inverter 19-5. The glowing of L1 indicates the "OVER" exposure; the glowing of L2, "1/1000" sec; the glowing of L3, "1/500" sec; the glowing of L4, the "UNDER" exposure; and the glowing of L5, the "OVER-FLOW" which represents an exposure limit. To the other input terminals of the AND circuits 19-6, 19-7, 19-8, 19-9 and 19-10 is applied a signal present at the output point G of the delay circuit 18 by way of the inverter 18-4.

Now the operation of the display circuit 19 will be explained. In the auto mode operation, upon depression of th shutter release button, a "0" signal is applied onto the control line 1-1 and the reversible counter 7 is reset. At this moment, the terminals $\overline{Q1}, \overline{Q2}, \overline{Q3}, \ldots, \overline{Qn}$ are all turned to "1," whereas the terminals Q1, Q2, Q3, . . . , Qn are all turned to "0." Accordingly, the output from the AND circuit 19-1 becomes "1," whereas the outputs from the AND circuits 19-2, 19-3, 19-4 and 19-10 become "0." Since the timing switch SW3 is still closed by this time, the signal level at the output point G of the delay circuit 18 becomes "0" and a "1" signal is applied to the AND circuits 19-6, 19-7, 19-8, 19-9 and 19-10 by way of the inverter 18-4, so that the output from the AND circuit 19-6 alone becomes "1" and the output from the inverter 19-11 becomes "0." Thus, the luminescent diode L1 glows to give an indication of "OVER," but the other luminescent diodes L2, L3, L4 and L5 do not glow.

Suppose now that 4 pulses are applied to the reversible counter 7 and as a result an exposure time of 1/1000 sec was obtained. Under these conditions, the signal level at Q3 is "1" and the signal level at $\overline{Q3}$ is "0." The output level from the AND circuit 19-2, therefore, becomes "1," the output level from the AND circuit 19-7 also becomes "1" and the output level from the inverter 19-12 becomes "0," so that the luminescent diode L2 glows to give an indication of "1/1000" sec. In this event, the terminal $\overline{Q3}$ of the AND circuit 19-1 becomes "0" and hence the output terminal of the AND circuit 19-1 turns to "0" to turn off the luminescent diode L1.

When 8 pulses are applied to the reversible counter 7, then the signal levels at $\overline{Q4}$ turn to "1" and "0," respectively, so that the output terminal of the AND circuit 19-8 becomes "1" to turn on the luminescent diode L3, giving an indication of "1/500" sec.

In the similar manner, depending on the number of pulses applied to the reversible counter 7, an appropriate shutter speed is indicated. On the other hand, when a pulse is applied to the last stage 7-n of the reversible counter 7, the luminescent diode L5 glows to give an indication of "OVER-FLOW." After opening the timing switch SW3 in association with the shutter release operation when the signal level at the output point G of the delay circuit 18 is inverted from "0" to "1," then the inverted signal is applied to the AND circuits 19-6, 19-7, 19-8, 19-9 and 19-10 by way of the inverter 18-4, so that the output points of these AND circuits are all turned to "0" and the glowing luminescent diode turns off.

In the manual mode operation, the reversible counter 7 is held in the reset position until the timing switch SW3 is opened and the signal level at the output point G of the delay circuit 18 is inverted. Thus, the output terminal of the AND circuit of the display circuit 19 alone is at the level of "1," which is applied to the AND circuit 19-6. To this AND circuit is also connected the control line 1-1 by way of the inverter 19-5. As is described previously, in the manual mode operation since the signal level on the control line 1-1 is "1," the output terminal of the AND circuit 19-6 is at the level of "0" and there is no luminescent diode glowing.

Unlike the conventional techniques, this invention makes it possible to introduce even those exposure time determining factors not included in the multiple series. While the invention has been described taking the film sensitivity as an example of exposure time determining factors not belonging in the multiple series, the similar means and arrangement are readily applicable to the diaphragm value. It is also possible to introduce the exposure time determining factors not included in the multiple series not by varying the switching level but by switching over the capacitors. In this event, the switching level is maintained at a constant level and additional capacitors are connected parallel to the capacitor which is serially connected to the photoconductive element.

We claim:

1. In an exposure time control device of an electric camera shutter: means including a brightness/time conversion circuit for developing a single pulse having a width representative of the brightness of a subject to be photographed; a reference pulse generating circuit for generating reference pulses at a constant rate; multistage counting means responsive to the single pulse and the reference pulses applied to a selected one of its counting stages for counting reference pulses during the duration of the single pulse; means for reading-out the count stored in said counting circuit upon the termination of said single pulse for controlling the exposure time of a camera shutter; and means for selectively varying the pulse width of the single pulse by accordingly selecting the particular counting stage to which the reference pulses are applied to said multi-stage counting means in dependence upon an exposure time parameter other than the brightness of the subject to thereby vary the number of reference pulses counted by said counting means and thereby effect control of the exposure time in dependence upon both the subject brightness and another exposure time parameter.

2. An exposure time control device according to claim 1; wherein said means for selectively varying the pulse width comprises a movable selector switch selectively movable to predetermined positions each corresponding to a different selected exposure time parameter, and means responsive to the positioning of said selector switch in respective ones of said positions for effecting variation of the single pulse width by a predetermined amount according to the selected exposure time parameter.

3. An exposure time control device according to claim 2; wherein said means responsive to the positioning of said selector switch includes means coacting with said brightness/time conversion circuit for determining the single pulse width in dependence upon both the subject brightness and the selected exposure time parameter.

* * * * *